(12) United States Patent
Skowronski

(10) Patent No.: US 6,318,066 B1
(45) Date of Patent: Nov. 20, 2001

(54) HEAT EXCHANGER

(76) Inventor: Mark J. Skowronski, 12165 Glines Ct., Tustin, CA (US) 92782

(*) Notice: Subject to any disclaimer, the term of this patent is extended or adjusted under 35 U.S.C. 154(b) by 0 days.

(21) Appl. No.: 09/459,112

(22) Filed: Dec. 10, 1999

Related U.S. Application Data (60) Provisional application No. 60/111,796, filed on Dec. 11, 1998.

(51) Int. Cl.⁷ .................................................. F02G 3/00
(52) U.S. Cl. .......................... 60/39.05; 165/166; 165/167
(58) Field of Search ............................ 60/39.511, 39.53; 165/166, 167

(56) References Cited

U.S. PATENT DOCUMENTS

| 4,362,462 | 12/1982 | Blotenberg . |
| 4,610,137 | 9/1986 | Nakamura et al. . |
| 4,653,268 | 3/1987 | Nakamura et al. . |
| 4,702,074 | 10/1987 | Munk . |
| 4,754,607 | 7/1988 | Mackay . |
| 4,773,846 | 9/1988 | Munk . |
| 5,095,693 | 3/1992 | Day . |
| 5,233,823 | 8/1993 | Day . |
| 5,271,215 | 12/1993 | Guillet . |
| 5,313,782 | 5/1994 | Frutschi et al. . |
| 5,513,488 | 5/1996 | Fan . |
| 5,599,382 | 2/1997 | Bielawski et al. . |
| 5,689,948 | 11/1997 | Frutschi . |
| 5,694,761 | 12/1997 | Griffin, Jr. . |

FOREIGN PATENT DOCUMENTS

| 0444913 A1 | 9/1991 | (EP) . |
| 1007140 | 5/1952 | (FR) . |
| 959336 | 5/1964 | (GB) . |

OTHER PUBLICATIONS

U.S. application No. 09/356409, Skowronski, filed Dec. 19, 1997.

Primary Examiner—Timothy S. Thorpe
Assistant Examiner—W. Rodriguez
(74) Attorney, Agent, or Firm—Ephraim Starr (57) ABSTRACT

A heat exchanger having a cold side flow path adjacent to and thermally coupled with a hot side flow path or other heat source, such that heat is transferred to the cold side flow path; and means for introducing evaporative fluid into the cold side flow path.

18 Claims, 3 Drawing Sheets

HEAT EXCHANGER

CROSS REFERENCE TO RELATED INVENTIONS

This application is related to and claims priority from provisional application Ser. No. 60/111,796, filed on Dec. 11, 1998, which is incorporated herein by reference.

FIELD OF THE INVENTION

The field of the present invention is heat exchangers used for increasing the thermal energy of combustion air in power generation systems.

BACKGROUND OF THE INVENTION

This invention relates generally to heat exchangers. While a specific embodiment relates particularly to a recuperator (or fixed boundary heat exchanger) suitable for use in a Brayton cycle combustion turbine or microturbine, the invention encompasses heat exchangers used in any power generation system that can be enhanced by the use of an efficient heat exchanger. Such systems include not only combustion turbines and microturbines, but also turbine-powered systems in combination with other power generation systems, such as solar arrays, fuel cells, and any other such system.

Combustion turbines are often part of a power generation unit, the essential components usually comprising the turbine, a compressor and a generator. These components are mechanically linked, often employing multiple shafts to increase the unit's efficiency. The generator is generally a separate shaft driven machine. Depending on the size and output of the combustion turbine, a gearbox is sometimes used to couple the generator with the combustion turbine's shaft output. Combustion turbines are sometimes recuperated, and in such cases, the invention described herein will improve the combustion turbine's performance.

Microturbines are relatively small, multi-fuel, modular, distributed power generation units having multiple applications, such as disclosed in U.S. Pat. No. 4,754,607, which is commonly assigned with the present invention. Microturbines are a new technology being developed for use in such applications as, without limitation, auxiliary power units, on-site generators, and automotive power plants. Microturbines are normally of single-shaft design and generally use a single stage, radial type compressor and/or turbine with an internal generator directly coupled to the turbine shaft. These machines are typically high speed, with rotational speeds in excess of 35,000 rpm. Microturbines offer the capability to produce electricity remotely, without the necessity of an expensive infrastructure to deliver power to end users, thus providing electricity to remote locations at a lower cost per kilowatt than is available from a traditional centralized power plant with its necessary infrastructure of transmission lines.

Generally, microturbines and combustion turbines operate in what is known as a Brayton Cycle. The Brayton cycle encompasses four main processes: compression, combustion, expansion and heat rejection. Air is drawn into the compressor, where it is both heated and compressed. The air then exits the compressor and enters the combustor, where fuel is added to the air and the mixture is ignited, thus creating additional heat. The resultant high-temperature, high-pressure gases exit the combustor and enter the turbine, where the heated, pressurized gases pass through the vanes of the turbine, turning the turbine wheel and rotating the turbine shaft. As the generator is coupled to the same shaft, it converts the rotational energy of the turbine shaft into usable electrical energy. In a single-shaft microturbine, the turbine, the compressor, and the generator share the single shaft, with the components commonly configured with the turbine at one end of the shaft, the compressor in the middle, and the generator at the opposite end of the shaft.

In the United States and other countries already having a suitable electric infrastructure, or electric grid, distributed generation units such as microturbines will allow consumers of electricity to choose the most cost-effective method of receiving electric service. In addition to primary power generation, microturbines also offer an efficient way to supply back-up power or uninterruptible power where needed.

Where a suitable electric infrastructure exists, the per kilowatt cost of electricity from the electric grid is predicted to remain lower than the per kilowatt cost of power generated by microturbines. Microturbine generated power may still be the appropriate choice when factors such as reliability or uninterruptability are considered, and it also provides an excellent supplement to grid power for peak shaving purposes. However, for off-peak applications and when cost per kilowatt is the primary consideration, electricity from an existing electric grid may still be the most economical source and is predicted to remain that way for the immediate future. Accordingly, although microturbines may provide a viable backup or alternative power source, microturbines must become more cost effective to compete directly with the electric grid as a primary power source. Increasing the efficiency of the microturbine will lower the per kilowatt cost of microturbine power, resulting in more cost-effective power.

In order to increase efficiency, microturbines and combustion turbines often utilize air-to-air primary surface or plate fin heat exchangers to recover thermal energy from the high temperature exhaust gases of the turbine. A heat exchanger has two basic flow paths: the hot side flow path and the cold side flow path. The hot exhaust gases of the turbine are routed through the hot side flow path of the heat exchanger, while the relatively cooler combustion air exits the compressor and is routed through the cold side flow path on its way to the combustor. Heat is transferred from the high temperature turbine exhaust gases in the hot side flow path to the lower temperature combustion air in the cold side flow path. The combustion air exits the heat exchanger and enters the combustor having been pre-heated, providing increased cycle efficiency and utilizing heat energy from the turbine exhaust gases that would otherwise be lost. After passing through the hot side flow path and losing some amount of heat to the cold side flow path, the turbine gases are exhausted from the system.

However, even when utilizing such a heat exchanger, room exists to further improve microturbines. Existing microturbines and combustion turbines do not operate as efficiently as possible, and existing heat exchangers may not increase efficiency in amounts significant enough to allow microturbines to compete directly in the primary power source marketplace with power supplied by the existing electric grid infrastructure.

An improvement to a microturbine power generation system was disclosed in U.S. patent application Ser. No. 09/356,409, filed Jul. 15, 1999, which is commonly assigned with the present invention. That application discloses a Fog Cycle whereby a micronized fluid is introduced upstream the cold side flow path of the microturbine's heat exchanger, providing a two-fold benefit: 1) increased heat transfer between the hot side flow path and the cold side flow path of the heat exchanger, and 2) increased mass flow into the turbine, with no additional load on the compressor. As used herein, a "micronized" fluid is defined as a fluid that is in the form of very fine particles, i.e., very small diameter droplets normally measured in microns (hence the concept of "micronized" fluid). The fine particles or droplets allow for rapid vaporization of the fluid when the fluid is injected into a combustion air stream. Typically, this fluid is water, but other fluids may be used. Micronized fluid may be produced relatively inexpensively by, for instance, passing the fluid through a nozzle under sufficiently high pressure to form the small droplets. Other methods, such as sonic vibration, can also be used to produce a micronized fluid.

However, simply introducing a micronized fluid upstream the cold side flow path of a heat exchanger does not achieve as much of an increase in efficiency as can be achieved with the present invention. Further, although the above discussion has concentrated on the shortcomings of current heat exchangers used with microturbines, the same shortcomings are found on heat exchangers used with traditional combustion turbines as well.

Thus, there exists a need for an improved heat exchanger that can enhance the performance of power generation systems such as microturbines and combustion turbines, so that such systems might operate more efficiently or provide electricity at a lower price per kilowatt. The heat exchanger of the present invention fills this need, and others, as described herein.

BRIEF SUMMARY OF THE INVENTION

The present invention provides a more effective and efficient way to operate a power generation system such as one that includes a microturbine or combustion turbine by providing greater heat transfer than known heat exchangers and by beneficially increasing the air mass entering the turbine. The present invention offers the ability to increase the overall efficiency of a turbine by up to 15 percent or even more, depending on operating pressures and temperatures.

In a combustion turbine or microturbine operating on the Brayton cycle, and utilizing a heat exchanger of the type disclosed here, combustion air exits the compressor, is humidified and heated in and throughout the heat exchanger, increasing both the temperature and the mass of the air, is mixed with fuel, is combusted, and is then expanded through a turbine. It is these high temperature turbine exhaust gases that commonly provide the heat source for the heat exchanger. The heat exchanger, which can also be referred to as a recuperator when it is used to recuperate heat from exhaust gases in a fixed-boundary heat exchanger device, routes the high temperature turbine exhaust gases through the hot side flow path, transferring heat to preheat the relatively lower temperature combustion air as it passes through the heat exchanger's cold side flow path. The heat exchanger may be one discrete unit, or may be comprised of a plurality of stages, analogous to a plurality of individual heat exchangers configured in series or in parallel. Thus, as used herein, "heat exchanger" is taken to mean the portion or portions of a power generation system that are used to increase the temperature of combustion air before it is combusted, via heat transfer. The heat exchanger can be a discrete component, or, alternatively, a plurality of components or modules such as individual heat exchanger cores connected to one another in series or in parallel. Further, "heat exchanger segment" as used herein is taken to mean the portion or portions of a power generation system that include the heat exchanger and the flow paths or duct work both upstream and downstream of the cold-side flow path or combustion air flow path of the heat exchanger itself.

Because heat exchangers are often constructed with more than one heat exchanger core, even if the heat exchanger itself is a discrete component, the following additional definitions may prove useful. First, as used herein, the embodiment referred to as a "discrete heat exchanger" is an embodiment in which one or more individual heat exchanger cores are in direct contact with one another. Second, as used herein, the embodiment referred to as a "modular heat exchanger" or a heat exchanger comprised of "modules" is an embodiment in which a plurality of heat exchanger cores are in indirect contact with one another and configured in series, in parallel, or both. In the discrete heat exchanger embodiment the cores may be housed within a single heat exchanger casing, or, if no casing as such is used, the external portions of the heat exchanger core pieces (for instance, the edges of the plates in a plate fin heat exchanger) will make up the external boundary of the discrete heat exchanger. Likewise, in the modular heat exchanger embodiment, the cores may be housed within a plurality of heat exchanger casings, or, if no casings as such are used, the external portions of the pieces of the heat exchanger cores (for instance, the edges of the plates in plate fin heat exchanger cores) will make up the external boundaries of each heat exchanger module.

In any of these general embodiments, micronized fluid is supplied to the cold side flow path of the heat exchanger at the heat exchanger's entrance, similar to the method disclosed in the Fog Cycle application. Sufficient micronized fluid is added for the air to reach its saturation point. The combustion air is then heated as it travels along the cold side flow path, and thus the air is dehumidified. Thus, the air is again below its saturation point, and additional micronized fluid is then added to the air to return the air to its saturation point. This additional fluid may be introduced directly into the cold side flow path of the heat exchanger core or plurality of cores, and/or introduced into the cold side flow path upstream of each of the plurality of modules of the heat exchanger that are connected in series or in parallel. Thus, whereas the Fog Cycle disclosed a single addition of fluid into the combustion air, the process of several of the embodiments disclosed herein continuously or repeatedly adds fluid to the air to keep the air at or near its saturation point.

Efficiency gains achieved by fluid injection are greatly increased by continuous or iterative application of the process—adding fluid to the air in the cold side flow path, letting the heat dehumidify the air, and then repeating the cycle. An ideal embodiment of the process would entail the continuous injection of an infinitesimal amount of fluid into the air as the air is infinitesimally dehumidified by an infinitesimal amount of heat. Thus, the more times the cycle is repeated throughout the process, the greater the efficiency gains. The process can be performed in a digital manner in repeated iterations, or in an analog manner with a constant addition of fluid along the path of the air.

In the analog model, additional fluid is added continuously within the heat exchanger, along the cold side flow path of the combustion air. In the digital model, fluid is added to the combustion air at intervals. These intervals may be along a single continuous path, or fluid may be added each time the air enters a discrete module of the heat exchanger.

In either model, the fluid is introduced into the combustion air stream in very fine micron sized droplets, allowing for nearly instantaneous evaporation. By introducing fluid into the combustion air, the air mass is increased, raising its ability to transfer heat and thus raising the efficiency of the heat exchanger. Further, if the fluid is introduced into the combustion air downstream of the power generation system's compressor, there is an increase in air mass entering the turbine with no additional load on the compressor.

The micronized fluid is introduced in the air stream approximately until the stream reaches its saturation point and the air is nearly or completely humidified. The humidified combustion air then continues its travel along the cold side flow path of the e heat exchanger where it is further heated and dehumidified as a result of the additional heating. Additional micronized fluid is then introduced into the stream of the preheated dehumidified combustion air and the air is again brought approximately to its saturation point. The fluid is then evaporated as the air moves further along the cold side flow path of the heat exchanger and continues to receive transferred heat. This further evaporation allows for the absorption of additional heat energy from the hot side turbine exhaust gases. As the air continues through the cold side flow path of the heat exchanger, it is further heated and thus dehumidified. As the combustion air is dehumidified, additional micronized fluid is introduced to re-humidify the combustion air. This humidification/dehumidification/re-humidification process continues throughout the heat exchanger, keeping the combustion air saturated or close to saturated humidified) at all times. The cycle may be repeated as many times as necessary to obtain the desired increase in mass flow and heat transfer to achieve the target increase in efficiency in the turbine.

Ideally, this cycle is achieved in an analog process, i.e., by a continuous addition of micronized fluid to keep the air at its saturation point as it travels along the cold side flow path and is continuously heated. However, this ideal analog-type cycle may be more cost-effectively approximated by a digital-type equivalent, where the air is first humidified, then heated, with the cycle repeated to reach the saturation point of the combustion air.

In one embodiment of the present invention, fluid nozzles for introducing fluid in a micronized state are placed at intervals along the cold side flow path within a heat exchanger to humidify the air. Commonly, the heat exchangers used in heat exchanger applications are modular, box-shaped heat exchangers. Thus, to increase the size of the heat exchanger requires only the addition of more modules of the heat exchanger. In such an embodiment of the present invention, rather than placing the micronizing fluid nozzles within the heat exchanger core or plurality of cores, the fluid nozzles are placed at the entrance to each module of the heat exchanger. Thus, the size of the heat exchanger and the amount of micronized fluid introduced may be economically controlled or changed. The air is humidified to or nearly to the point of saturation outside of a module of the heat exchanger, then enters the module to be further heated. The air then exits that module, is further humidified to or nearly to the point of saturation by the addition of micronized fluid, and enters an additional module of the heat exchanger. Additional modules may be added in series or in parallel to achieve the desired increase in heat and mass, within limits that result from such considerations as the operating pressures and temperatures of the cycle, the desired physical size of the overall system package, material costs, and other such considerations.

It will be appreciated that a variety of other configurations may be employed to accomplish the required heating and humidification, ranging from the analog model, with the constant addition of micronized fluid and heat, to the digital model, with the staged processes of heating and humidification, and anything in between. In a standard heat exchanger, the addition of micronizing fluid nozzles would achieve more frequent humidification/dehumidification cycling, while in a staged or modular heat exchanger, additional modules with micronizing fluid nozzles at the entrance to each would provide more frequent humidification/dehumidification cycling. In either case, the temperature of the combustion air entering the combustor is increased from its previous temperature when leaving the compressor, providing for more efficient combustion.

The micronized fluid used in the present invention may be fresh water having low mineral content, which helps to avoid mineral build up on the components of the microturbine system. Untreated tap water and well water can also be used, as can other evaporative fluids. When tap or well water is used, a purification process such as filtration, reverse osmosis or demineralization may also be desirable to preserve the useful life of the system components or to increase the time needed between maintenance intervals. Other fluids that may be used to enhance the evaporation rate include refrigerants, although a recovery process for these fluids may be necessary to make their use more economically attractive. Such recovery means include known means commonly used in connection with conventional gas turbines.

In yet another embodiment of the invention, very small diameter fluid droplets, which can be micronized water droplets, are injected upstream of the eat exchanger and downstream from the compressor. The injection of the atomized or micronized droplets is done in quantities that exceed the saturation limit of the pressure and temperature that define the state point of the compressor discharge. However, there is no fallout or precipitation of the super-saturated fluid because the amount of fluid injected, the velocity of the air stream into which the fluid is injected, and the size of the fluid droplets are monitored and controlled through various instrumentation and control features, to maintain desired vaporization rate and preclude any precipitation in or after the heat exchanger. Sensors are located at the generator, the nozzle, the throttle valve, and the pump. The flow rate through the throttle valve, pump and nozzle are adjusted based on the sensor data to avoid precipitation. The fluid droplet sizes may be varied through changes in fluid pressure and, as beneficial, by varying nozzle shapes. During different load settings of the combustion turbine or microturbine, the air flow velocity through the cold side of the heat exchanger is changed and the combustion air temperature from the compressor is changed. Accordingly, in this embodiment, both the size of the fluid droplets and the flow rate of the injected fluid are varied to achieve maximum evaporation and humidity ratio in the combustion air stream throughout the heat exchanger. This embodiment works well in a microturbine or combustion turbine that has the ability to vary the speed of the compressor and/or turbine; however, even without such variables, benefits can be achieved merely by the manipulation of the injected fluid's flow rate and changing the fluid's droplet size in the combustion air prior to the heat exchanger.

In each of the foregoing embodiments, the efficiency of the heat exchanger in terms of its ability to transfer heat to combustion air in the cold side flow path is increased relative to heat exchangers that do not make use of the present invention. Moreover, the mass of air entering the turbine is increased by the addition of micronized fluid, and the increase in mass is achieved with no additional load on the compressor (if a compressor is present), thus increasing the overall efficiency of the power generation system.

BRIEF DESCRIPTION OF THE DRAWINGS

The details and features of the present invention may be more fully understood by referencing the detailed description and drawings in which.

DETAILED DESCRIPTION OF THE INVENTION

Figure 1:
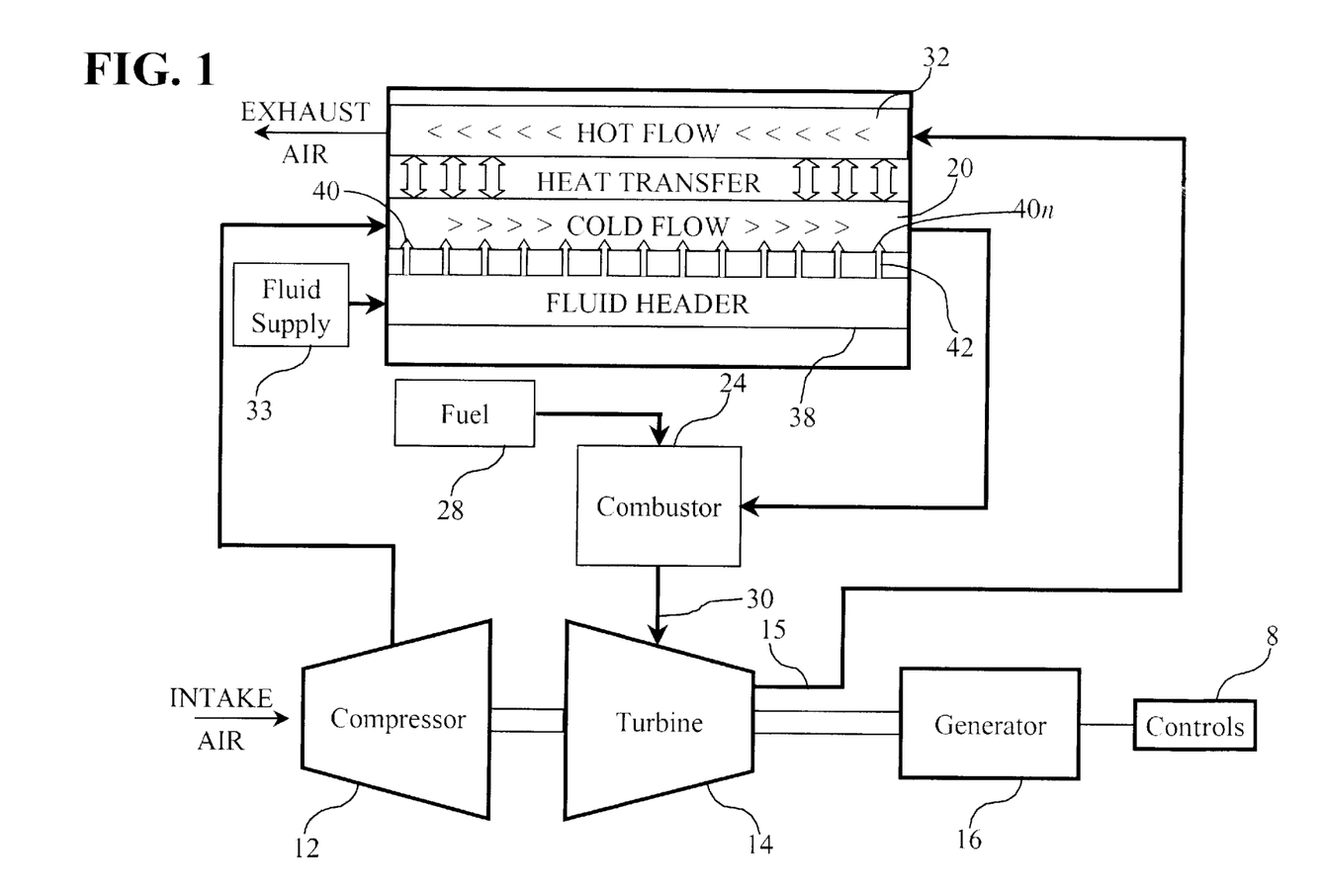
FIG. 1 is a schematic diagram of a heat exchanger in accordance with one embodiment of the present invention.

Structurally, as illustrated in FIG. 1, a microturbine power generating system 10 in which the present invention can be used includes a compressor 12, a combustor 24, a turbine 14 for converting gaseous heat energy into mechanical energy, and an electrical generator 16 for converting the mechanical energy produced by the turbine into electrical energy. The generator, which includes a rotor 34 and a stator 36, is coupled to electronic controls 8, which monitor and regulate the power output and power requirements of the system. In the embodiment shown in FIG. 1, the compressor 12, turbine 14, and generator 16 are linked together on a single shaft 18 and rotate in unison. The compressor 12 compresses inlet air, which is then supplied as compressed combustion air to the cold side flow path 20 of a heat exchanger 22 constructed in accordance with the present invention. The turbine exhaust outlet 15 supplies hot exhaust gases to the hot side flow path 32 of the heat exchanger 22.

The temperature of the exhaust gases can vary depending upon power generation system requirements and the materials used in the construction of the heat exchanger. While superalloys or ceramic materials can withstand exhaust gas temperatures that exceed 2000° F., some less expensive metals may require temperatures of less than about 1400° F. However, because the present invention can be practiced with a variety of heat exchanger materials, the phrases "hot exhaust gas(es)" and "high temperature exhaust gas(es)" are not meant to require the exhaust gases to have a specific temperature; rather, they are used to mean that the temperature of the exhaust gas is sufficient to transfer heat to combustion air and to enhance the evaporation or evaporation rate of the fluid that is introduced into the combustion air in accordance with this invention.

The heat exchanger utilizes heat transfer between the exhaust air (hot side flow path 32) and the combustion air (cold side flow path 20) to preheat the combustion air before it is mixed with fuel from a fuel delivery system 28, ignited and combusted in the combustor 24, delivered through a turbine inlet 30, and expanded through the turbine.

The present invention takes advantage of the fact that, as air heats, its saturation point increases. Thus, the ideal heat exchanger is a fluid atomization spray system that injects the mist in an infinitesimal amount once the combustion air has been infinitesimally dehumidified by an infinitesimal amount of heat. Although such a process is analog and difficult to attain in practice, it can be approximated by breaking the heat exchanger into two or more discreet segments. In the embodiment shown in FIG. 1, each of the fluid header limbs 42 represents such a discreet segment. Additional segments could be added for increased efficiency of the heat exchanger. In an alternative embodiment, represented in FIG. 2, the heat exchanger is divided into separately housed stages, or modules 50a–50f, with the fluid being added to the cold side flow path at the entrance to each module. The operation of the collective modules is similar to the heat exchanger shown in FIG. 1, but the separately housed modules allow for the introduction of micronized fluid at the entrance to each module, rather than via header limbs that are routed into the core of the heat exchanger itself, and thus provide an alternative and perhaps more economical approach to introducing micronized fluid into the heat exchanger.

In one embodiment, illustrated in FIG. 1, the heat exchanger 22 is a single unit enclosed in a single casing. The hot side flow path 32 is adjacent to the cold side flow path 20, allowing for heat transfer. The fluid supply 33 supplies fluid to the fluid header 38, which provides a plurality of header limbs 42 providing fluid to the spray nozzles 40, which are located intermittently along the cold side flow path 20. It will be appreciated by those skilled in the art that the fluid header 38 can comprise a conduit, a pipe, a flexible metal coupling, a hose, a combination of the foregoing, or any other method of transporting the fluid from the fluid source to the fluid nozzles that is known in the art. The spray nozzles 40 provide micronized fluid to humidify the combustion air along the cold side flow path 20. After the combustion air is humidified at a nozzle 40, the air continues along the cold side flow path 20 toward the next nozzle 40. It will be further appreciated by those skilled in the art that in addition to a conventional mechanical nozzle, other nozzles and other types of fluid introduction devices, as disclosed below, may also be used.

As the air moves along the path, it is continuously heated and thus dehumidified, and the micronized fluid previously introduced is evaporated. The air then reaches the next nozzle 40, where additional micronized fluid is introduced and the cycle is repeated. The cycle continues until the combustion air passes the last nozzle 40n, exits the heat exchanger 22, and enters the combustor 24. The placement and total number of spray nozzles 40 depends on the heat available and the required increase in mass. If there is more excess heat available, the air in the cold side flow path will be dehumidified more quickly, allowing for closer spacing of the fluid spray nozzles. As closer spacing of the nozzles will mean a higher total number of nozzles, more micronized fluid will be added to the air, and the increase in mass will be greater. In this context, as used in the claims, a nozzle or other means for introducing fluid at a point located "appreciably" downstream of the preceding fluid introduction point is taken to mean that the downstream introduction point is located far enough downstream so that, before the combustion air reaches the downstream fluid introduction point, the fluid from the upstream fluid introduction point has had sufficient time for a substantial amount of said fluid to evaporate using the available heat from the adjacent heat source or hot side flow path.

Figure 2:
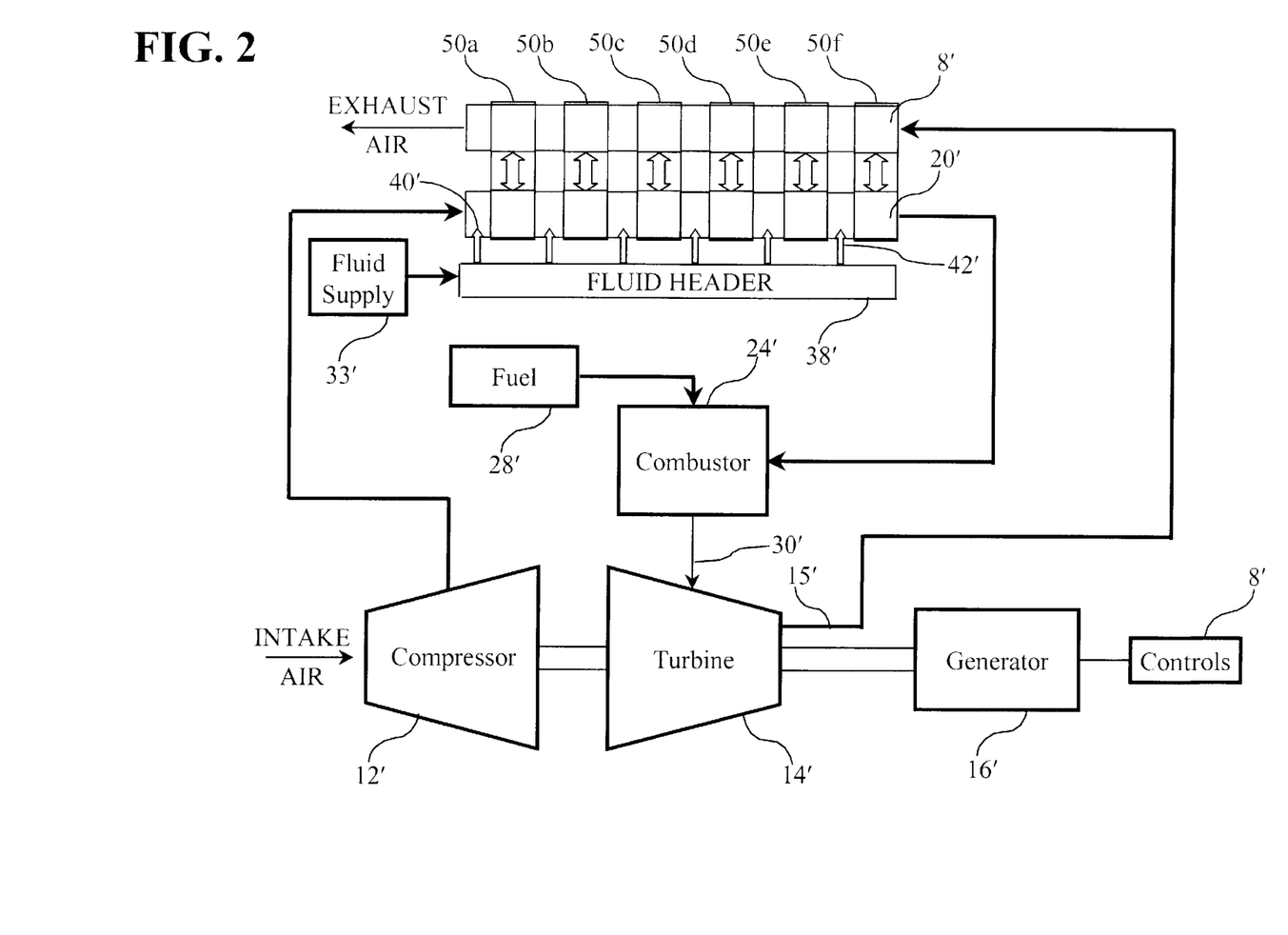
FIG. 2 is a schematic diagram of a heat exchanger in accordance with another embodiment of the present invention.

In another embodiment, illustrated in FIG. 2, the heat exchanger consists of a series of discrete modules 50a–50f. Each module consists of a hot side flow path 32' adjacent to a cold side flow path 20', allowing for heat transfer between the flow paths. A fluid header 38' provides a plurality of header limbs 42', which provide a spray nozzle 40' at the entrance to each module 50a–50f. The spray nozzles 40' provide micronized fluid in micron sized droplets to humidify the combustion air along the cold side flow path 20' before the air enters the first heat exchanger stage 50a. After the combustion air is humidified at a nozzle 40', the air continues along the cold side flow path 20' through the module 50a, where it is heated and thus dehumidified by the heat transfer with the hot side flow path 32', evaporating the previously introduced micronized fluid. The combustion air then exits the first module 50a, is humidified at the next nozzle 40', and enters the next adjacent stage 50b, where the cycle is repeated. The desired number of stages is determined by the desired increase in heat and mass of the combustion air. The cycles continue until the combustion air passes through the last module, and enters the combustor 24'. (While the last module is shown in FIG. 2 as module 50f, it is understood that fewer than or more than six modules can be used, and the depiction of six modules in FIG. 2 is for the sake of example.) This type of improved heat exchanger may be more cost effective than the single encasement heat exchanger, as fluid spray nozzles can be placed at the entrance to each module of the heat exchanger rather than within a single heat exchanger core or within a plurality of heat exchanger cores that are each within a single housing.

The micronized fluid is introduced in the combustion air stream until or almost until the stream reaches its saturation point and the air is completely humidified. In one embodiment, the saturation point for the air, and the amount of fluid necessary to reach such point, is calculated beforehand based on the temperature, pressure and compression parameters of the turbine, which parameters may be approximated by the mass flow of the system. A sensor (not shown) monitors mass flow into the turbine, and a controller 8 adjusts flow of the micronized fluid based on the mass flow. The humidified combustion air then continues its travel within the heat exchanger, where the air is further preheated and dehumidified as a result of the heat transfer from the hot side flow path. The dehumidified combustion air then continues on, either within the single heat exchanger or on to the next module of the heat exchanger. Micronized fluid is then again introduced into the stream of the preheated dehumidified air and the air is again brought approximately to its saturation point. The combustion air is then additionally heated as it continues along its path. The process is repeated as many times as needed to obtain the target increase in air temperature, mass flow through the turbine, and in the overall efficiency of the system, or until saturation is reached, which is a function of the firing temperature and pressure ratio of the system. Efficiency increases in this cycle relative to a cycle using a traditional heat exchanger because more heat is recovered from the turbine exhaust gases and transferred to the combustion air. The total output of the cycle increases since the mass flow rate through the turbine increases without increasing the work of the compressor, as the increase in mass flow comes from an evaporative liquid downstream of the compressor.

To supply the fluid to the cold side flow path of the heat exchanger, a plurality of spray nozzles 40 extend directly into the cold side flow path, as shown in FIG. 1. The fluid flows to the spray nozzles through a high-pressure header 38 and a plurality of header limbs 42. The header is supplied with fluid by a fluid supply 33. It will be appreciated by those skilled in the art that a fluid tank may supply fluid by gravity means, a pump, a combination of the foregoing, or other know methods of supplying fluid from a tank. In addition, the fluid supply could advantageously include a connection to a city or local water supply. The spray nozzles themselves are preferably of a type adapted for introducing micronized fluid, such as a type of demister that is presently commercially available and used for evaporative air cooling to compressors. It will be appreciated by those skilled in the art that ultrasonic, variable orifice, or any other type of nozzle known in the art may also be used.

In another alternative embodiment, illustrated in FIG. 3, the size and flow of the fluid droplets are controlled by a variable geometry nozzle in proportion to the air flow to the heat exchanger. The air flow is a function of the output of the microturbine or combustion turbine when a variable speed machine is used or when there are inlet vanes to control the air input into the machine.

The micronized fluid is sprayed in the combustion air stream downstream from the compressor and upstream of the heat exchanger. Sensors (not shown), coupled to a Central Control Unit 8", are located at the pump 24, the throttle valve 52, the variable geometry nozzle 40", and the generator 16". Based on the input from the sensors, the pump speed is varied, the throttle valve is operated to control both pressure and flow, and the geometry of the nozzle is varied to change the droplet size. The Central Control Unit 8" receives and processes the sensor data, and proportionately controls the pump 24, the throttle valve 52, the variable geometry nozzle 40", and the generator 16" accordingly, to optimize the humidification of the combustion air.

The rate of the evaporation of the fluid droplets in the combustion air stream is a function of all of the parameters monitored:

1. rate of air flow (which determines air velocity in the heat exchanger and is a function of turbine generator output);
2. the droplet size (smaller droplets will evaporate exponentially faster than larger size droplets);
3. fluid flow rate (which can be controlled by the variable speed pump or throttle valve; and,
4. exhaust flow rate and temperature (which determines the ultimate amount of heat of available for droplet evaporation and is, ultimately, a function of the turbine generator output.

The atomized fluid is sprayed into the combustion air downstream from the compressor and upstream of the heat exchanger and supersaturates the combustion air. Due to the velocity of the combustion air stream, the droplet size and the flow rate of the fluid, there is little or no precipitation. The combustion air in the cold side 20" of the heat exchanger is gradually heated by the turbine exhaust stream in the hot side 32" of the heat exchanger, transferring heat and gradually evaporating more and more fluid until all of the fluid is evaporated into the combustion air stream. Under ideal conditions, the combustion air will be at or near saturation. However, in practice, the amount of humidity may be less than saturation or near saturation at the exit of the heat exchanger on the cold side 20". The Central Control Unit 8" is programmed to maximize the amount of humidity given the known operating parameters and the data from the sensors.

In another embodiment, specific monitoring of the air flow, exhaust flow and fluid flow is implemented by placing sensors in appropriate locations, and coupling the sensors to the Central Control Unit 8". However, it will be appreciated by those skilled in the art that in other embodiments such monitoring may not be required. These parameters could be controlled on a proportional basis as integrated by the Central Control Unit. Alternative methods, not relying on proportioning, which may incorporate specific measurement, monitoring and control of both fluid flow rate and droplet size to optimize the fluid rate evaporation and to maximize the humidity in the air flow stream may also be used. The Central Control Unit integrates the necessary parameters and then optimizes the flow rate of the fluid and the droplet size to maximize the humidity ratio in the air vapor stream exiting the heat exchanger.

Two phase flow (vapor and liquid) resulting from the precipitation of over injecting the fluid into the combustion air stream may be avoided by control of the flow rate and droplet size of the fluid, which are modulated as a function of turbine generator output. This method provides an alternative to using a plurality of modules of the heat exchanger as shown in FIG. 2, and also provides a means for adding the desired amount of fluid to the heat exchanger that is alternative to the stream injection means described in FIG. 1.

A combustion turbine or microturbine power system using any one of the embodiments of the present invention operates on a Brayton cycle. When the nozzles introduce the fluid into the combustion air in the cold side flow path of the heat exchanger, the micronized fluid droplets cool the combustion air due to the evaporative effect of the fluid, and increase the mass flow through the heat exchanger. Consequently, the heat exchanger becomes more effective and captures more of the waste heat discharged from the turbine exhaust. Efficiency of the Brayton cycle is increased because additional mass and heat is injected into the cycle; the total output of the cycle is increased because mass flow rate has been increased through the turbine. Additionally, the increased mass flow rate through the turbine does not increase the amount of compressor work required, because the increase in mass flow comes from evaporative fluid injected downstream of the compressor.

Figure 3:
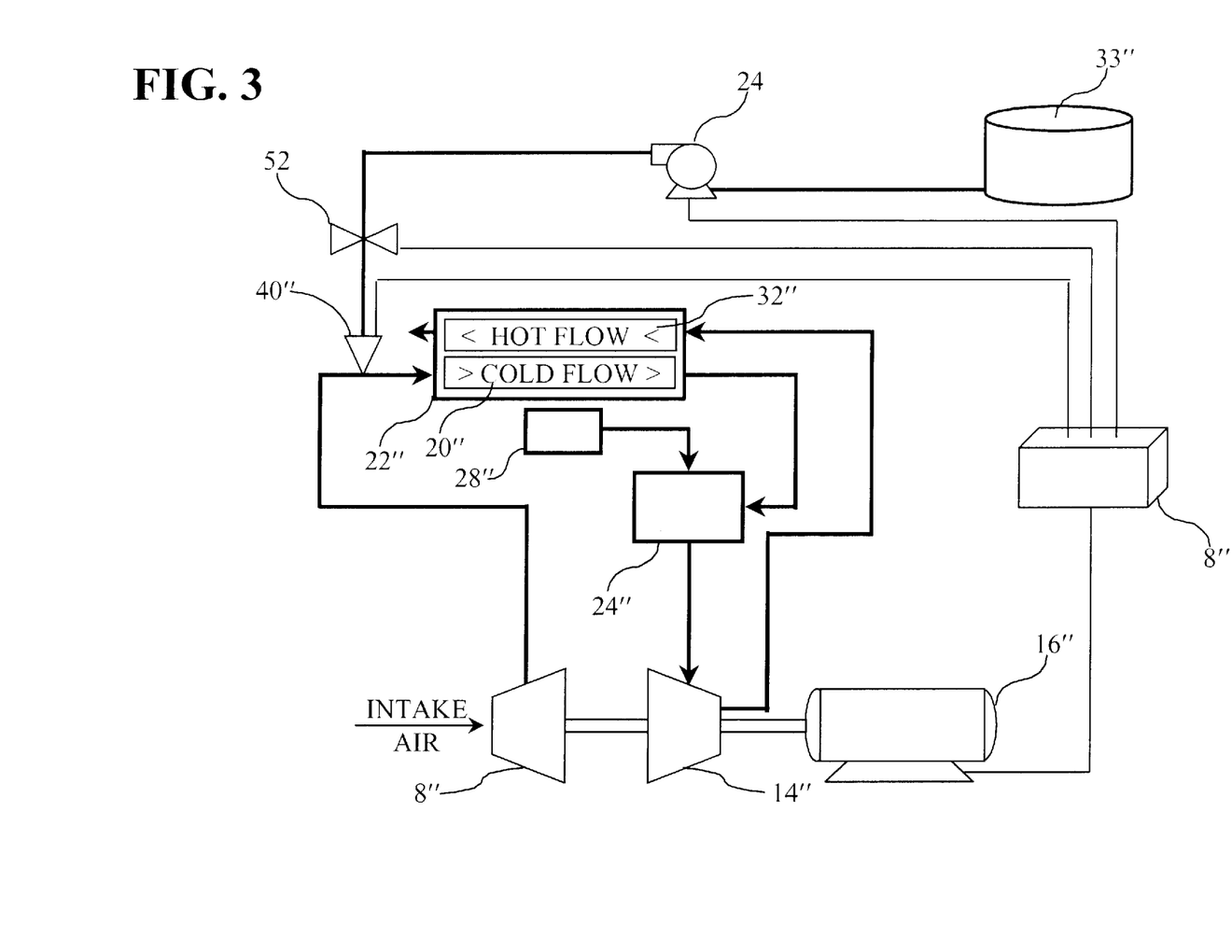
FIG. 3 is a schematic diagram of a heat exchanger in accordance with an additional embodiment of the present invention.

Although the present invention has been described with reference to the embodiments shown in FIGS. 1–3, alternative embodiments exist. For instance, in one alternative embodiment, a single high-pressure header delivers fluid to the cold side flow path of the heat exchanger directly, without employing header limbs. The header in this embodiment is in direct contact with the cold side flow path at a plurality of injection points where spray nozzles are used to inject the fluid from the header into the heat exchanger. In another embodiment, a fluid misting line runs the length of the cold side flow path, constantly delivering micronized fluid as the air is constantly heated. It will also be appreciate that, while the above embodiments have been described as employing nozzles or misters, other fluid introduction devices may be used. Choices include, for instance, nozzles (including low pressure spray nozzles, high pressure spray nozzles, electrostatic nozzles, ultrasonic nozzles and other types of nozzles), orifices, misters, foggers (including mechanical, ultrasonic, and other types of foggers), or any other fluid introduction devices that are known in the art.

Furthermore, while the embodiments shown are directed to a microturbine, the present invention applies to combustion turbines and other power generation systems. For instance, those skilled in the fields of power generation and/or heat transfer will recognize that the present invention can be used to enhance the efficiency or power output of any power generation system that utilizes one or more heat exchangers. The invention is not limited to a recuperator; rather, the invention encompasses any heat exchanger that is used, at least in part, to increase the temperature of combustion air in a power generation system via heat transfer. The heat exchanger will not necessarily include a hot side flow path, but may use an alternative means for transferring heat to combustion air in the cold side flow path, such as a heat source proximate to or in contact with the cold side flow path. The heat source could comprise a solar array that collects and channels heat to a location proximate to or in contact with the cold side flow path; electrical components such as stator wiring, transformers and other components that may generate excess heat; combustion components, such as a combustor housing or liner that can dissipate substantial heat; the waste heat of compression; or a direct source such as light or the sun. Accordingly, the invention is not to be limited except by the proper scope of the claims that follow.

What is claimed is:

1. A heat exchanger for increasing the mass flow of combustion air in a power generation system, comprising:
   a cold side flow path through which combustion air flows after compression by an air compressor and before entering a combustion chamber;
   means for increasing the temperature of the combustion air as it flows through the cold side flow path;
   means for introducing a first amount of fluid into the cold side flow path at a first point;
   means for evaporating the first amount of fluid at a first location within the cold side flow path;
   means for introducing an additional amount of fluid into the cold side flow path at one or more additional points located appreciably downstream of said first point; and
   means for evaporating at least a portion of the additional amount of fluid at a second location within the cold side flow path.

2. A heat exchanger as in claim 1, wherein the means for increasing the temperature of the combustion air as it flows through the cold side flow path is a hot side flow path, at least a portion of the hot side flow path being adjacent to and thermally coupled with the cold side flow path.

3. A heat exchanger as in claim 1, wherein each of said means for introducing fluid introduce fluid in a micronized state.

4. A heat exchanger as in any of claim 2 or 3, wherein the heat exchanger is a recuperator.

5. A heat exchanger for increasing the mass flow of combustion air in a power generation system, comprising:
   a hot side flow path;
   a cold side flow path through which combustion air flows, at least a portion of the cold side flow path being adjacent to and thermally coupled with the hot side flow path;
   means for introducing fluid into the cold side flow path at a location within said portion of the cold side flow path that is adjacent to and thermally coupled with the hot side flow path; and
   means for evaporating the fluid within the cold side flow path.

6. A heat exchanger as in claim 5, wherein said means for introducing fluid introduces fluid in a micronized state.

7. A heat exchanger as in claim 6, wherein the micronized fluid is water.

8. A heat exchanger as in claim 7, wherein the means for introducing water comprises:
   a high pressure water header,
   one or more piping branches, and
   one or more water introduction devices, the water header coupled to a first end of each of said one or more piping branches, the one or more water introduction devices coupled to a second end of each of said one or more piping branches, each of said second ends being opposite to each corresponding first end.

9. A heat exchanger as in claim 8, wherein the one or more water introduction devices are chosen from the group including nozzles, orifices, misters, and foggers.

10. A heat exchanger for increasing the mass flow of combustion air in a power generation system, comprising:
    a plurality of modules located between an air compressor and a combustion chamber, and a plurality of fluid introduction devices, each module further comprising a cold side flow path having an entrance and an exit, said cold side flow paths being indirectly coupled to one another, wherein at least one of said fluid introduction devices is located approximately at the entrance to the cold side flow path of at least one module.

11. A heat exchanger as in claim 10, wherein the cold side flow paths of said modules are coupled to one another in series via ducting.

12. A heat exchanger as in claim 10, wherein the cold side flow paths of said modules are coupled to one another in parallel via ducting.

13. A heat exchanger as in claim 10, wherein the plurality of fluid introduction devices are chosen from the group including nozzles, orifices, misters, and foggers.

14. A heat exchanger for increasing the mass flow of combustion air in a power generation system, comprising:

a heat source;

a cold side flow path through which combustion air flows, at least a portion of the cold side flow path being adjacent to and thermally coupled with the heat source; and a fluid introduction device disposed within said portion of the cold side flow path that is adjacent to and thermally coupled with the heat source.

15. A heat exchanger as in claim 14, wherein the heat source is chosen from the group that includes: a hot side flow path through which hot exhaust gases pass, a solar array, heat-dissipating electrical components, heat-dissipating lining of combustion components, and light.

16. A heat exchanger, comprising:

an enclosed hot side air flow passage;

an enclosed cold side air flow passage adjacent to and in thermal communication with the hot side flow passage;

a fluid source, coupled to a fluid distribution system, distributing fluid to one or more fluid introduction devices located within the cold side air flow passage at a location therein that is adjacent to and thermally coupled with the hot side air flow passage, and providing micronized fluid into the cold side air flow passage.

17. A heat exchanger system, comprising:

a plurality of heat exchangers as in claim 16 coupled in series.

18. A heat exchanger system, comprising:

two or more heat exchangers, each having an enclosed hot side air flow path and an enclosed cold side air flow path, said flow paths thermally coupled with each other, the heat exchangers configured to be arranged in series, with the cold side air flow path of a first heat exchanger connecting to the cold side air flow path of a next heat exchanger, a fluid source, coupled to a fluid distribution system, distributing fluid to one or more fluid introduction devices located at the entrance to the cold side air flow path of each heat exchanger and providing micronized fluid into the cold side air flow path.

* * * * *